United States Patent
Fukushima et al.

(10) Patent No.: US 8,009,339 B2
(45) Date of Patent: *Aug. 30, 2011

(54) HOLOGRAPHIC RECORDING MEDIUM, HOLOGRAPHIC WRITING SYSTEM AND HOLOGRAPHIC READING SYSTEM

(75) Inventors: Yoshihito Fukushima, Miyagi (JP); Kazuya Hayashibe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,082

(22) Filed: Nov. 23, 2009

(65) Prior Publication Data

US 2010/0067074 A1 Mar. 18, 2010

Related U.S. Application Data

(63) Continuation of application No. 11/608,614, filed on Dec. 8, 2006, now Pat. No. 7,701,627.

(30) Foreign Application Priority Data

Dec. 12, 2005 (JP) ................................. P2005-357485

(51) Int. Cl.
*G03H 1/02* (2006.01)
*G03H 1/10* (2006.01)
*G03H 1/26* (2006.01)
*G03H 1/04* (2006.01)

(52) U.S. Cl. .................... 359/3; 359/10; 359/22; 359/35
(58) Field of Classification Search .................... None
See application file for complete search history.

(56) References Cited

U.S. PATENT DOCUMENTS

| 7,502,151 B2 * | 3/2009 | Toishi et al. ...................... 359/3 |
| 7,701,627 B2 * | 4/2010 | Fukushima et al. ................ 359/3 |
| 2010/0157398 A1 * | 6/2010 | Fukushima et al. ............... 359/3 |

FOREIGN PATENT DOCUMENTS

| JP | 06349066 | 12/1994 |
| JP | 2002032001 | 1/2002 |
| JP | 2003317247 | 11/2003 |
| JP | 2005159104 | 6/2005 |
| JP | 2005167008 | 6/2005 |
| JP | 2005175049 | 6/2005 |
| JP | 2005175050 | 6/2005 |
| JP | 2005183426 | 7/2005 |

* cited by examiner

*Primary Examiner* — Stephone B Allen
*Assistant Examiner* — Jade R Chwasz
(74) *Attorney, Agent, or Firm* — K&L Gates LLP

(57) ABSTRACT

A holographic recording medium including a recording layer on a substrate, which records data information in a light interference pattern. In the holographic recording medium, information on a thermal expansion characteristic of a recording material contained in the recording layer and/or information on temperature dependency of the refractive index of the recording material are recorded within the holographic recording medium in advance.

3 Claims, 6 Drawing Sheets

HOLOGRAPHIC RECORDING MEDIUM, HOLOGRAPHIC WRITING SYSTEM AND HOLOGRAPHIC READING SYSTEM

CROSS REFERENCES TO RELATED APPLICATIONS

The present application is a continuation of U.S. patent application Ser. No. 11/608,614, filed on Dec. 8, 2006, which claims priority to Japanese Patent Application JP2005-357485 filed in the Japanese Patent Office on Dec. 12, 2005 the entire contents of which being incorporated herein by reference.

BACKGROUND

The present application relates to a holographic recording medium and a holographic writing system and holographic reading system that use the holographic recording medium.

A holographic recording scheme records by causing the interference between the signal light including a two-dimensional data pattern and reference light and changing the physical properties of a recording layer containing a recording material in accordance with the distribution of strength of the interference fringes.

The photopolymer functioning as the recording material is characterized in that (1) the refractive index can be highly modulated, which can provide a high diffraction efficiency; (2) easy processing is allowed; (3) low noise; and (4) low costs. Thus, the photopolymer is an extremely potential material for putting the holographic recording to use.

However, photopolymer shrinks and swells largely due to a temperature change, which has an important effect on data reading when the data reading is performed at a different temperature from that of recording since the thermal shrinking/swelling of the recording layer changes the space between the interference fringes recorded within the recording layer. The refractive index of a recording material also depends on the temperature, and the change in refractive index changes the diffraction condition, which has an important effect on data reading as well as shrinking/swelling.

The degree of the effects may depend on the difference in temperature between recording and reading, the linear expansion coefficient of a recording material, the temperature characteristic of the refractive index, the numerical aperture of a lens, the size of a recording data pixel and the thickness of a recording layer.

By the way, in holographic data recording, the amount of photopolymer contributing to recording may be increased in order to increase the recording density, and the increase can be achieved by increasing the thickness of the recording layer. However, the increase in thickness of the recording layer may increase the severity of the condition (or selectivity) for the diffraction, and the effect on data reading due to a thermal deformation is larger in a thicker recording layer even with a same linear expansion coefficient.

Alternatively, the recording density can be increased by decreasing the size of recording data pixels for increasing the data capacity of one page or increasing the numerical aperture of a lens for decreasing the size of the unit hologram area within a recording material. However, like the case with the recording layer with an increased thickness, the diffraction condition becomes severer due to the shrinking or swelling of a recording material.

A method has been proposed which relates to the swelling/shrinking of a recording layer due to the surrounding temperature and compensates the effect by adjusting the laser wavelength in reading (see JP-A-2002-32001 (Patent Document 1), for example).

However, the adjustment of the laser wavelength in reading is difficult when the characteristics of a recording material such as the linear expansion coefficient and the temperature characteristic of the refractive index and the environment (including the temperature and wavelength) in writing are not available.

SUMMARY

Accordingly, it is desirable to propose a holographic recording medium and a holographic writing system and holographic reading system that use the holographic recording medium, which can properly correct the shift of the diffraction condition due to the shrinking/swelling of a recording medium and a change in refractive index caused by a change in temperature between those in writing and reading data information and can read data information in a stable manner.

According to an embodiment, there is provided a holographic recording medium including a recording layer on a substrate, which records data information in a light interference pattern, wherein information on a thermal expansion characteristic of a recording material contained in the recording layer and/or information on temperature dependency of the refractive index of the recording material are recorded within the holographic recording medium in advance.

In this case, the information on a thermal expansion characteristic of the recording material may be a linear expansion coefficient in an actually-used environment temperature area of the holographic recording medium.

The information on the temperature dependency of the refractive index of the recording material may be a primary coefficient of the ratio of a change in refractive index in accordance with a change in temperature in an actually-used environment temperature area of the holographic recording medium.

The information on the thermal expansion characteristic of the recording material and/or the information on the temperature dependency of the refractive index of the recording material may be recorded as emboss pits of the substrate.

Data information recorded on the recording layer and information on the temperature and the writing wavelength in writing the data information may be recorded.

In this case, information on the temperature and writing wavelength in writing the data information may be recorded by a holographic recording scheme.

In this case, the information on the temperature and writing wavelength in writing the data information may be written in larger pixel units than a minimum pixel unit used for writing data information.

Information on a reference temperature and information on a reference wavelength for adjusting the wavelength of writing light for writing data information to the recording layer or the wavelength of reading light for reading data information from the recording layer may be recorded within the holographic recording medium in advance.

In this case, the information on the reference temperature and the information on the reference wavelength may be recorded as the emboss pits of the substrate.

According to another embodiment, there is provided a holographic writing system that uses a holographic recording medium according to the embodiment above and writes data information on the holographic recording medium by irradiating writing light to the holographic recording medium, the system including an optical head that irradiates the writing light to the holographic recording medium, and temperature measuring means for measuring the surrounding temperature of the holographic recording medium, wherein, in writing data information to a recording layer of the holographic recording medium, information on the surrounding temperature measured by the temperature measuring means and the wavelength of writing light irradiated from the optical head is recorded within the holographic recording medium.

In this case, the information on the surrounding temperature measured by the temperature measuring means and the wavelength of writing light irradiated from the optical head may be recorded on the recording layer by a holographic recording scheme.

The information on the surrounding temperature measured by the temperature measuring means and wavelength of the writing light irradiated from the optical head may be written in larger pixel units than a minimum pixel unit used for writing data information.

According to another embodiment, there is provided a holographic reading system that uses the holographic recording medium according to the embodiment above, the system including an optical head having reading light creating means for creating reading light to be irradiated to the holographic recording medium by using laser light emitted from a reading laser, wavelength control means for changing the wavelength of the reading light, and a servo laser that emits servo light having a different wavelength from that of the reading light, an optical system that irradiates the reading light or servo light to the holographic recording medium and gathers reading light generated by the holographic recording medium by the reading light or servo light returned by the servo light by including information from the holographic recording medium, an imaging element that detects the reading light, a light detector that detects the servo light, and temperature measuring means for measuring the surrounding temperature of the holographic recording medium, wherein data information is read from the holographic recording medium by irradiating the reading light to the holographic recording medium, and data information is read by changing the wavelength of the reading light by the wavelength control means so as to satisfy a diffraction condition on the recording layer based on information on the thermal expansion characteristic of the recording material and/or information on the temperature dependency of the refractive index of the recording material, which is read from the holographic recording medium, information on the temperature in writing data information and information on the wavelength of writing light, and information on the surrounding temperature in reading data information, which is measured by the temperature measuring means, and irradiating the reading light to the holographic recording medium.

In this case, the information on the thermal expansion characteristic of the recording material and/or the information on the temperature dependency of the refractive index of the recording material may be read by irradiating the servo light with the wavelength which is not sensible by the recording material.

The information on the temperature in writing data information and information on the wavelength of writing light may be read by irradiating reading light by changing the wavelength so as to extract the information.

Data information may be read by changing the wavelength $\lambda r$ of the reading light to the range of the values calculated by one of:

$$0.99*((1+(\alpha-\beta)*(Tr-Tw))*\lambda w) \leq \lambda r \leq 1.01*((1+(\alpha-\beta)*(Tr-Tw))*\lambda w) \quad [1];$$

$$0.99*((1+\alpha(Tr-Tw))*\lambda w) \leq \lambda r \leq 1.01*((1+\alpha(Tr-Tw))*\lambda w) \quad [2]; \text{ and}$$

$$0.99*((1-\beta(Tr-Tw))*\lambda w) \leq \lambda r \leq 1.01*((1-\beta(Tr-Tw))*\lambda w) \quad [3]$$

where information on the thermal expansion characteristic of the recording material is a linear expansion coefficient $\alpha$, information on the temperature dependency of the refractive index of the recording material is a primary coefficient $\beta$ of the ratio of a change in refractive index in accordance with a change in temperature, information on the temperature in writing data information is a temperature Tw, information on the wavelength of the writing light is a wavelength $\lambda w$, and information on the surrounding temperature in reading data information is a temperature Tr, and irradiating the reading light to the holographic recording medium.

Data information may be read by adjusting the optical zoom in accordance with a change in wavelength of reading light by the wavelength control means.

According to another embodiment, there is provided a holographic writing system that uses the holographic recording medium according to the embodiment above, the system including an optical head having writing light creating means for creating writing light to be irradiated to the holographic recording medium by using laser light emitted from a writing laser, wavelength control means for changing the wavelength of the writing light, and a servo laser that emits servo light having a different wavelength from that of the writing light, an optical system that irradiates the writing light or servo light to the holographic recording medium and gathers servo light returned by the servo light by including information from the holographic recording medium, a light detector that detects the servo light, and temperature measuring means for measuring the surrounding temperature of the holographic recording medium, wherein data information is written in the holographic recording medium by irradiating the writing light to the holographic recording medium, and data information is written by changing the wavelength of the writing light by the wavelength control means based on information on the thermal expansion characteristic of the recording material and/or information on the temperature dependency of the refractive index of the recording material, which is read from the holographic recording medium, information on a reference temperature and information on a reference wavelength, and information on the surrounding temperature in writing data information, which is measured by the temperature measuring means, and irradiating the writing light to the holographic recording medium.

The information on the thermal expansion characteristic of the recording material and/or the information on the temperature dependency of the refractive index of the recording material and the information on the reference temperature and the information on the reference wavelength may be read by irradiating the servo light with the wavelength which is not sensible by the recording material.

Data information may be written by changing the wavelength $\lambda w$ of the writing light to the range of the values calculated by one of:

$$0.99*((1+(\alpha-\beta)*(Tw-Tc))*\lambda c) \leq \lambda w \leq 1.01*((1+(\alpha-\beta)*(Tw-Tc))*\lambda c) \quad [4];$$

$$0.99*((1+\alpha(Tw-Tc))*\lambda c) \leq \lambda w \leq 1.01*((1+\alpha(Tw-Tc))*\lambda c) \quad [5]; \text{ and}$$

$$0.99*((1-\beta(Tw-Tc))*\lambda c) \leq \lambda w \leq 1.01*((1-\beta(Tw-Tc))*\lambda c) \quad [6]$$

where information on the thermal expansion characteristic of the recording material is a linear expansion coefficient α, information on the temperature dependency of the refractive index of the recording material is a primary coefficient β of the ratio of a change in refractive index in accordance with a change in temperature, information on the reference temperature is a temperature Tc, information on the reference wavelength is a wavelength λc, and information on the surrounding temperature in writing data information is a temperature Tw, and irradiating the writing light to the holographic recording medium.

According to another embodiment, there is provided a holographic reading system that uses the holographic recording medium according to the embodiment above, the system including an optical head having reading light creating means for creating reading light to be irradiated to the holographic recording medium by using laser light emitted from a reading laser, wavelength control means for changing the wavelength of the reading light, and a servo laser that emits servo light having a different wavelength from that of the reading light, an optical system that irradiates the reading light or servo light to the holographic recording medium and gathers reading light generated by the holographic recording medium by the reading light or servo light returned by the servo light by including information from the holographic recording medium, an imaging element that detects the reading light, a light detector that detects the servo light, and temperature measuring means for measuring the surrounding temperature of the holographic recording medium, wherein data information is read from the holographic recording medium by irradiating the reading light to the holographic recording medium, and data information is read by changing the wavelength of the reading light by the wavelength control means based on information on the thermal expansion characteristic of the recording material and/or information on the temperature dependency of the refractive index of the recording material, which is read from the holographic recording medium, information on the reference temperature and information on the reference wavelength, and information on the surrounding temperature in reading data information, which is measured by the temperature measuring means, and irradiating the reading light to the holographic recording medium.

The information on the thermal expansion characteristic of the recording material and/or the information on the temperature dependency of the refractive index of the recording material, the information on the reference temperature and the information on the reference wavelength may be read by irradiating the servo light with the wavelength which is not sensible by the recording material.

Data information may be read by changing the wavelength λr of the reading light to the range of the values calculated by one of:

$$0.99*(1+(\alpha-\beta)*(Tr-Tc))*\lambda c \leq \lambda r \leq 1.01*((1+(\alpha-\beta)*(Tr-Tc))*\lambda c \quad [7];$$

$$0.99*((1+\alpha(Tr-Tc))*\lambda c) \leq \lambda r \leq 1.01*((1+\alpha(Tr-Tc))*\lambda c) \quad [8]; \text{ and}$$

$$0.99*((1-\beta(Tr-Tc))*\lambda c) \leq \lambda r \leq 1.01*((1-\beta(Tr-Tc))*\lambda c) \quad [9]$$

where information on the thermal expansion characteristic of the recording material is a linear expansion coefficient α, information on the temperature dependency of the refractive index of the recording material is a primary coefficient β of the ratio of a change in refractive index in accordance with a change in temperature, information on the reference temperature is a temperature Tc, information on the reference wavelength is a wavelength λc, and information on the surrounding temperature in reading data information is a temperature Tr, and irradiating the reading light to the holographic recording medium.

Data information may be read by adjusting the optical zoom in accordance with a change in wavelength of reading light by the wavelength control means.

According to the embodiments, a holographic reading system that records information on a thermal expansion coefficient and a temperature characteristic of a change in refractive index on a medium in advance and uses a holographic recording medium that records in writing information on the wavelength and temperature in writing allows the estimation of the wavelength of reading light satisfying a diffraction condition even when the surrounding temperatures of the optical head in writing and reading differ. Thus, data information can be read fast and in a stable manner.

The information on the wavelength of writing light and the surrounding temperature in writing can be read with a wider wavelength range by using a holographic recording medium that records the information on the wavelength and temperature in data writing in larger pixels than a minimum pixel included in normal data information.

The holographic writing system using a holographic recording medium that records information on a reference wavelength and reference temperature within the medium in advance allows the adjustment of the wavelength of writing light based on the reference temperature and the surrounding temperature in writing.

The holographic reading system that uses a holographic recording medium that records information on a reference wavelength and reference temperature within the medium in advance can eliminate the necessity to consider the surrounding temperature in writing when data information is read and allows the estimation of a proper wavelength for reading data information only by using the surrounding temperature in reading. Furthermore, when the information on a reference wavelength and reference temperature is recorded within a medium in advance, the holographic writing system can eliminate the necessity to record writing conditions (such as the surrounding temperature and wavelength) by a holographic recording scheme. In addition, the holographic reading system can eliminate the necessity to read the writing conditions by a holographic recording scheme in reading. Thus, the wavelength of reading light can be estimated more securely.

Additional features and advantages are described herein, and will be apparent from, the following Detailed Description and the figures.

DETAILED DESCRIPTION

A construction of a holographic recording medium according to an embodiment of the invention will be described below.

Figure 1:
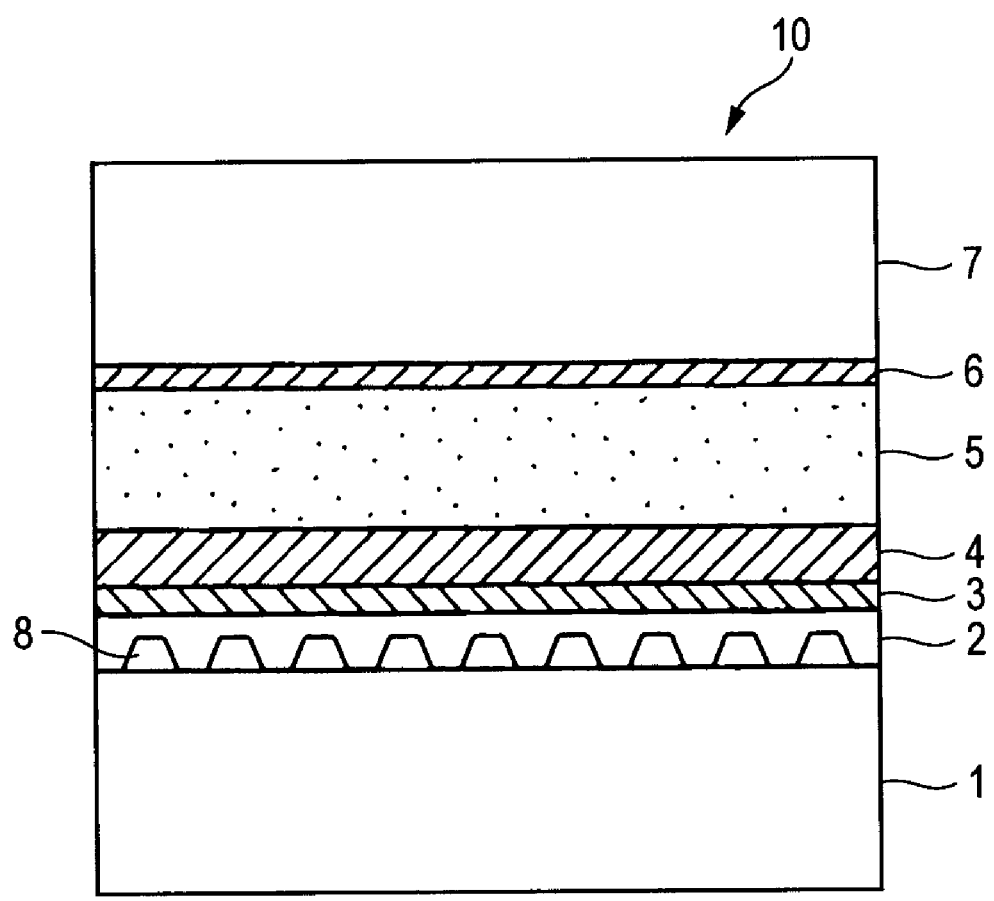
FIG. 1 is a section diagram showing a construction of a holographic recording medium according to an embodiment.

FIG. 1 is a section diagram showing a construction example of a holographic recording medium according to an embodiment of the invention.

A holographic recording medium 10 has emboss pits (or guide channel) 8 for providing address information or servo on a clear substrate 1 of glass or polycarbonate, for example, and a reflector (not shown) coated with AlTi thereon. The holographic recording medium 10 further has a stack of a gap layer 2, a wavelength filter 3, a protective layer 4, a recording layer 5, a protective layer 6 and a light transmitting layer 7 in this order. The gap layer 2 has a plastic film attached onto the reflecting layer with a UV hardening resin or adhesive by spin-coating. The wavelength filter 3 is a wavelength-selective reflector.

Here, the wavelength filter 3 is an optical multi-layer film designed to allow red laser light to pass through for obtaining address information or servo from the emboss pits 8 and reflect green or blue laser light for recording a hologram. For example, the wavelength filter 3 is formed by placing a high-refractive layer such as $TiO_2$ and $Nb_2O_5$ and a low-refractive layer such as $MgF_2$ and $SiO_2$ next to each other and repeatedly performing a vacuum thin film forming technology such as vapor-deposition and sputtering with high precision.

The protective layer 4 is for protecting the wavelength filter 3 from a recording material included in the recording layer 5 and does not importantly react with a recording material. For example, the protective layer 4 may be formed by spin-coating a UV hardening resin coating and then UV-hardening or by attaching thereto a plastic film with an adhesive.

The recording layer 5 includes a recording material such as a photopolymer and records data information by a light interference pattern.

The protective layer 6 prevents a plastic substrate of the light-transmitting layer 7 and the recording layer 5 from the direct contact if the light-transmitting layer 7 includes the plastic substrate. The protective layer 6 may not be provided if the light-transmitting layer 7 contains glass.

The light-transmitting layer 7 includes a glass or plastic substrate of polycarbonate, for example, and preferably contains a material having a low optical anisotropy.

The holographic recording medium 10 records in advance information on a thermal expansion characteristic of a recording material included in the recording layer 5 and/or temperature dependency information on the refractive index of the recording material.

In this case, the information on the thermal expansion characteristic of a recording material is preferably a linear expansion coefficient in a temperature area in an actually used environment of the holographic recording medium 10. The temperature dependency information of the refractive index of a recording material is preferably a primary coefficient of the ratio of the temperature change of the refractive index in the temperature area in an actually used environment of the holographic recording medium 10.

Preferably, information on the thermal expansion characteristic of a recording material and/or temperature dependency information on the refractive index of the recording material are recorded as the emboss pits 8 on the substrate 1.

Preferably, the holographic recording medium 10 according to an embodiment of the invention records either:

[Information 1]: data information recorded in the recording layer 5 and information on the surrounding temperature of the holographic recording medium in data information writing and on the wavelength of writing light, where the information on the surrounding temperature of the holographic recording medium in data information writing and the wavelength of writing light may be recorded in the recording layer 5 by a holographic recording scheme, and the information on the temperature and recording wavelength in data information writing is preferably recorded in larger pixel units than a minimum pixel unit used for data information recording, or

[Information 2]: information on a reference temperature and information on a reference wavelength for adjusting the wavelength of writing light for writing data information to the recording layer 5 or the wavelength of reading light for reading data information from the recording layer 5, where reference temperature information and reference wavelength information are further preferably recorded as the emboss pits 8 on the substrate 1.

Figure 2:
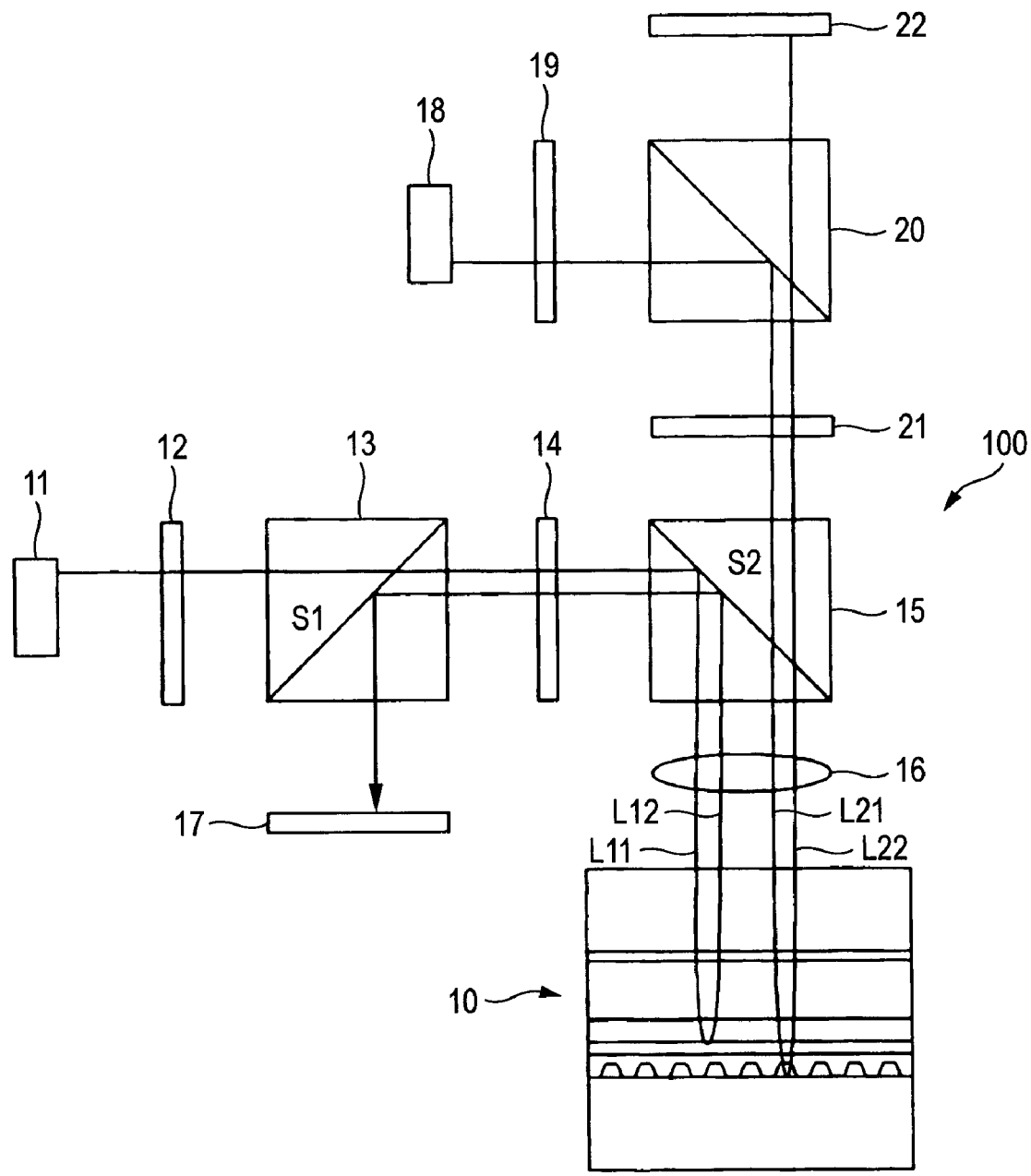
FIG. 2 is a schematic diagram showing a construction of an optical head of a holographic writing/reading system according to an embodiment.

Next, constructions of a holographic writing system and holographic reading system according to an embodiment of the invention will be described. FIG. 2 is an optical block diagram showing a construction of an optical system (optical head) 100 used for a holographic writing/reading system also functioning as a holographic writing system and holographic reading system according to an embodiment of the invention.

FIG. 2 shows a writing/reading laser 11.

An embodiment of the invention includes a wavelength control unit (not shown) that changes the wavelength of laser light emitted from the writing/reading laser 11. A single mode may be implemented here by providing an external resonator in a semiconductor laser (that is, the writing/reading laser 11) with a wavelength of 405 nm, for example (as disclosed in JP-A-2005-183426, JP-A-2005-175050, JP-A-2005-175049, JP-A-2005-167008 and JP-A-2005-159104). Alternatively, a diffraction grating (for modulating the refractive index) may be built in an element of the semiconductor laser for electrically controlling the refractive index and changing the wavelength (which implements a DFB laser or a DBR laser).

FIG. 2 further shows a space modulating element 12 for creating a two-dimensional contrast data pattern. Generally, a hologram causes the interference of two optical fluxes of signal light and reference light, and the interference fringes are recorded on a recording medium. According to an embodiment of the invention, one space modulation element 12 divides light from the writing/reading laser 11 into a part corresponding to signal light and a part corresponding to reference light and emits them as signal light and reference light (writing light) L11. The interference fringes of them are recorded in the recording layer 5. In reading, the part corresponding to the reference light is only irradiated to the recording layer 5 as the reference light (reading light) L11, which results in diffracted light.

FIG. 2 further shows a polarized light beam splitter 13 having an S1-plane which allows P-polarized light to pass through and reflects S-polarized light. The polarizer is adjusted such that the light exiting from the space modulating element 12 can be the P-polarized light on the S1-plane, and the light exiting from the space modulating element 12 can pass through the S1-plane.

FIG. 2 further shows a ¼ wave plate 14 that causes the light incident on the holographic recording medium 10 to be circularly polarized light. The ¼ wave plate changes circularly polarized light (reading light) L12 reflected from a disk (that is, the holographic recording medium 10 here) to S-polarized light, and the light beam of the S-polarized light therethrough is reflected by the polarized light beam splitter 13 and is captured by an imaging element 17 such as a CCD and a C-MOS.

FIG. 2 further shows a dichromic mirror 15 designed to reflect, by a plane S2, the signal light and reference light (writing light) or reference light (reading light) L11 and reading light L12 (blue light) and allows servo light L21 and servo light L22 (red light) to pass through.

FIG. 2 further shows a condenser 16 that gathers the writing light or reading light L11 (blue light) and servo light L21 (red light) within the holographic recording medium 10.

FIG. 2 further shows a servo laser 18 that emits light to be the servo light L21 and emits light with a wavelength which is not sensible by the recording layer 5, unlike the wavelength of the writing/reading laser 11. For example, a semiconductor laser with a wavelength of 650 nm may be used.

FIG. 2 further shows a ½ wave plate 19 that adjusts the light emitted from the servo laser 18 to be S-polarized light incident by a polarized light beam splitter 20.

The polarized light beam splitter 20 allows P-polarized light to pass through and reflects S-polarized light by the S-plane.

FIG. 2 further shows a ¼ wave plate 21 that causes the light incident on the holographic recording medium 10 to be circularly polarized light (servo light L21) and changes the circularly polarized light (servo light L22) reflected from the holographic recording medium 10 to P-polarized light.

FIG. 2 further shows a servo information detector 22 that receives servo light including the information of the emboss pits 8 reflected back from the holographic recording medium 10. More specifically, the servo light reflected back from the holographic recording medium 10 passes through the dichromic mirror 15 and then through the ¼ wave plate 21 and becomes P-polarized light. The P-polarized light passes through the polarized light beam splitter 20 and is received by the servo information detector 22.

A holographic writing system and holographic reading system according to embodiments of the invention include a temperature measuring unit (not shown) that measures the surrounding temperature of the holographic recording medium 10.

Figure 3:
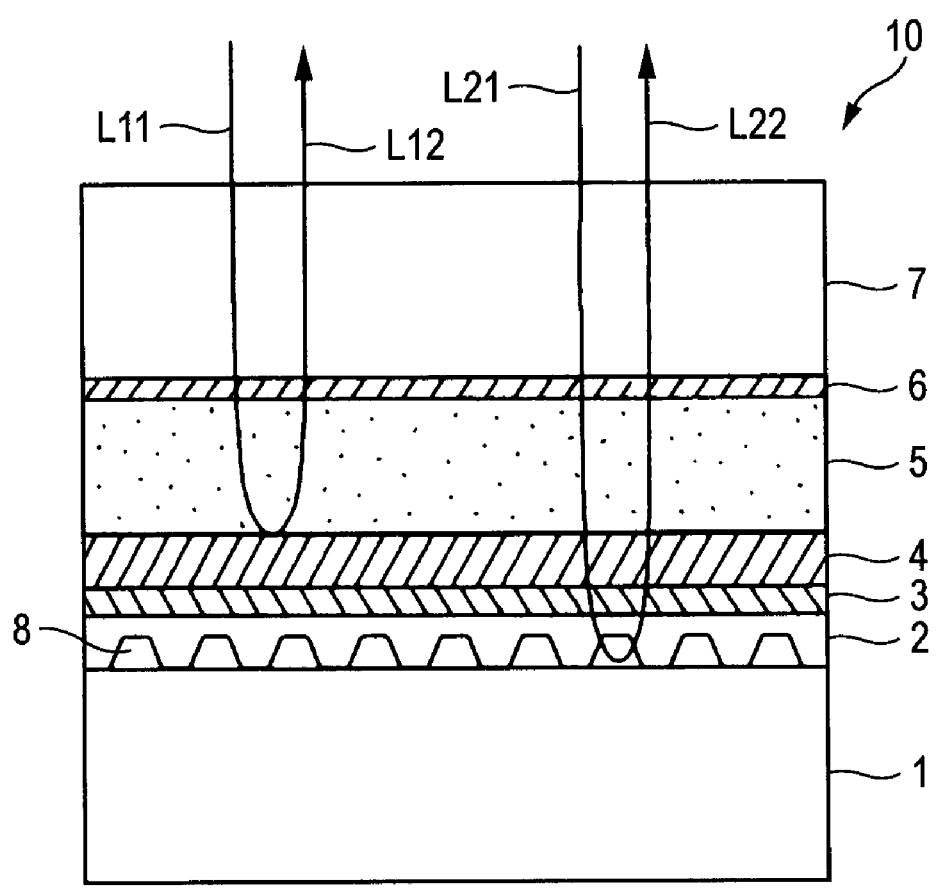
FIG. 3 is a schematic diagram showing a state of irradiation and reflection of light to/from a holographic recording medium according to an embodiment.

In order to write on the holographic recording medium 10, writing light (signal light and reference light) L11, which is laser light with a blue wavelength, from an optical head 100 is irradiated from the light-transmitting layer 7 side as shown in FIG. 3 so as to create an interference pattern within the recording layer 5 of the holographic recording medium 10. The signal light and reference light of the incident writing light L11 interfere with each other in the recording layer 5 and thus create an interference pattern, which implements writing. The writing light L11 then passes through the recording layer 5 and enters to the wavelength filter 3 but is reflected by the wavelength filter 3 and becomes reflected light.

Figure 4:
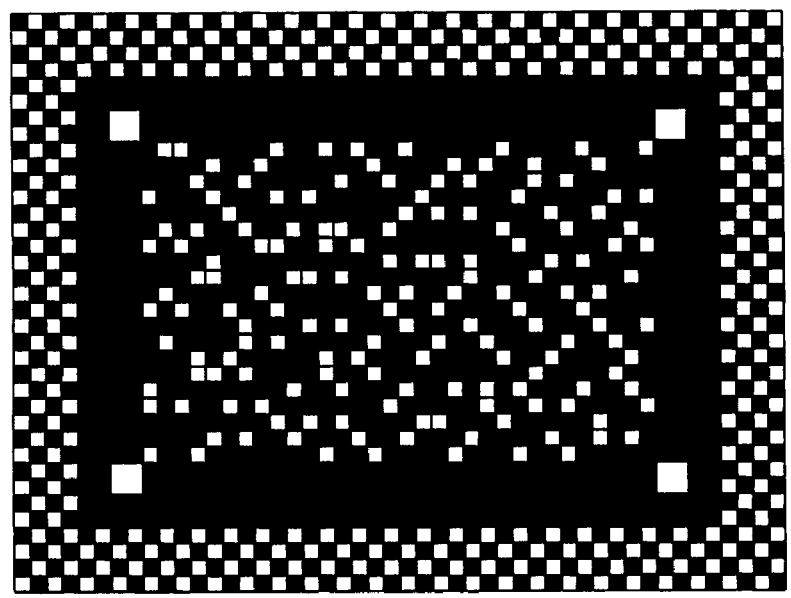
FIG. 4 is a diagram showing a pattern in a space modulating element in recording.

FIG. 4 shows a pattern in the space modulation element 12 in writing. The pattern may be divided into a data signal area at the center and a reference light area outside. The reference light area generally has a fixed pattern.

In order to write on the holographic recording medium 10, writing light having a spatial distribution of strength of the pattern shown in FIG. 4 is gathered into the recording layer 5 of the holographic recording medium 10 by the condenser 16. Then, a distribution of refractive index reflecting the distribution of strength occurs in the recording layer 5, whereby writing is performed.

In order to read from the holographic recording medium 10, the reading light (reference light) L11, which is laser light with a blue wavelength, is focused onto the recording layer 5 of the holographic recording medium 10 from the optical head 100 and is irradiated from the light-transmitting layer 7 side. The incident reading light L11 becomes diffracted light in accordance with the interference pattern on the recording layer 5 and is emitted from the surface of the holographic recording medium 10 as reading light L12.

Figure 5:
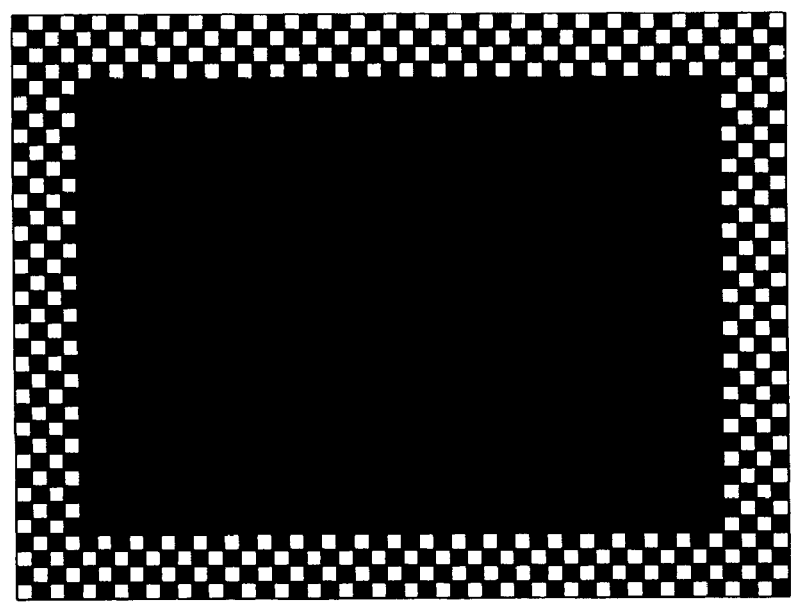
FIG. 5 is a diagram showing a pattern in a space modulating element in reading.
Figure 6:
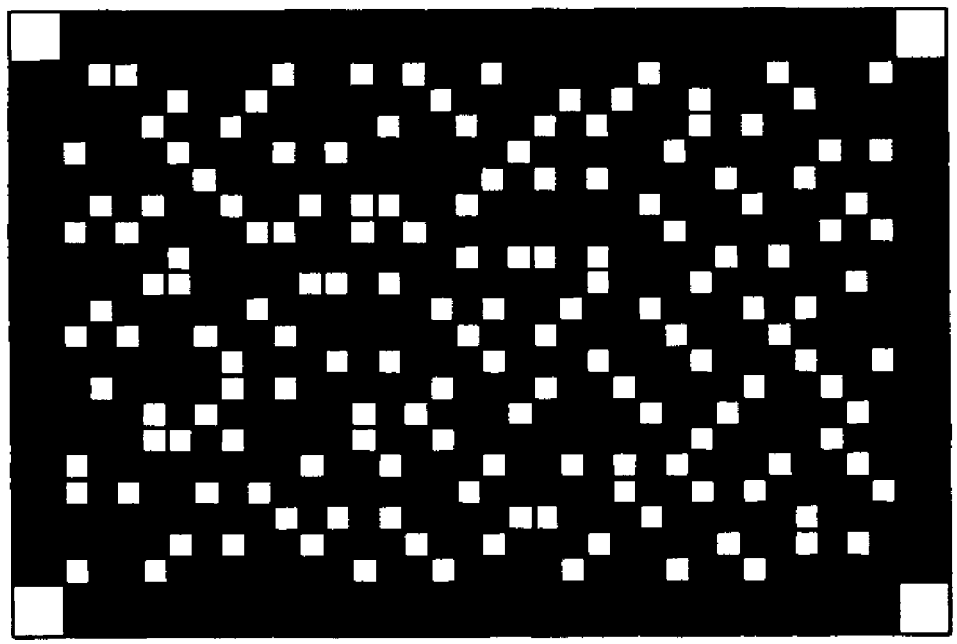
FIG. 6 is a diagram showing a diffracted light pattern reproduced under a diffraction condition.

More specifically, the light through the pattern in the space modulating element 12 as shown in FIG. 5 is caused to enter to the holographic recording medium 10 as the reading light L11. When the reading light L11 satisfies the distribution of refractive index and diffraction condition within the recording layer 5, the diffracted light pattern as shown in FIG. 6 can be obtained, whereby data information is read.

Here, the satisfaction of the diffraction condition is significantly important for reading data information. Especially, a difference in surrounding temperature of the holographic recording medium 10 between writing and reading causes thermal expansion/contraction and/or a change in refractive index in the recording layer 5. Then, when reading is performed with reading light with the same wavelength as that in recording, the diffraction condition is not satisfied, which prevents the data reading.

Laser light (red light) with a red wavelength, as the servo controlling light (servo light) L21, from the optical head 100 is irradiated from the light-transmitting layer 7 side so as to focus on the emboss pits 8 (more strictly, the reflector thereabove). In this case, the servo light L21 is reflected by the reflector through the light transmitting layer 7, protective layer 6, recording layer 5, protective layer 4, wavelength filter 3 and gap layer 2 and then, as the reflected light (servo light) L22 including the information in accordance with the emboss pits 8, is emitted from the surface of the holographic recording medium 10 through the gap layer 2, wavelength filter 3, protective layer 4, recording layer 5, protective layer 6 and light-transmitting layer 7 again (FIG. 3).

EXAMPLES

As examples of the invention, the writing/reading to/from the holographic recording medium 10 employing the holographic writing/reading system shown in FIG. 2 will be described below.

Here, the holographic recording medium 10 includes:

substrate 1: a plastic substrate of polycarbonate having the emboss pits 8 on the surface and an AlTi film of a thickness of 20 nm as a reflector thereon, gap layer 2: formed by crimping a polycarbonate (PC) film (of a total thickness of 100 μm) having a pressure-sensitive adhesive layer, protective layer 4: formed by crimping PC/SiO$_2$ laminated film (of a total thickness of 100 μm) having a pressure-sensitive adhesive layer, protective layer 6: an SiO$_2$ layer (of a thickness of 20 nm), and light transmitting layer 7: a PC substrate of a thickness of 0.6 mm.

In the optical head 100, a semiconductor laser with a wavelength of 405 nm to which an external resonator is installed to work in a single mode is used as the writing/reading laser 11 and a semiconductor laser with a wavelength of 650 nm is used as the servo laser 18.

Example 1

An Example in which the Temperature and Wavelength in Writing are Recorded as Holographic Data As described above, a difference in surrounding temperature of the holographic recording medium 10 between writing and reading causes thermal expansion/contraction and/or a change in refractive index in the recording layer 5. Then, when reading is performed with reading light with the same wavelength as that in recording, the diffraction condition is not satisfied, which prevents the data reading. However, the diffraction condition can be satisfied by changing the wavelength in reading. In this case, for example, if the thermal expansion coefficient, material characteristic such as a temperature-dependent characteristic of the refractive index, temperature in writing, wavelength and temperature in reading of the recording layer 5 are available, the approximate wavelength in reading that satisfies the diffraction condition can be estimated.

The thermal expansion coefficient, and temperature-dependent characteristic of the refractive index of the recording layer 5 may be considered as being inherent to the recording material thereof and may be recorded on the holographic recording medium 10 as the emboss pits 8 in advance. For example, like an optical disk such as an MO and a DVD having a place where the information on a medium such as an optimum writing power is recorded in advance, the holographic recording medium 10 according to this example of the invention may have such a place where the information on the thermal expansion coefficient and temperature-dependent characteristic of the refractive index is recorded in advance. The information of the emboss pits 8 is preferably read by the wavelength, which is not sensible by the recording layer 5. For example, servo light may be used.

Since the thermal expansion coefficient itself of the recording material is also temperature-dependent, some thermal expansion coefficient values in an assumed used temperature environment, such as 5° C. to 55° C., are desirably recorded. However, the representation with one value ($\alpha$) in the temperature range does not have a large effect on the estimation of the wavelength of reading light that satisfies the diffraction condition.

The temperature dependency of the refractive index may be approximated as that the refractive index changes substantially linearly in accordance with a change in temperature in a certain temperature range. Thus, a factor of proportionality (which is a temperature-characteristic coefficient of the refractive index here) exists for each temperature like the thermal expansion coefficient, and the temperature characteristic coefficients of the refractive indices for some temperatures are desirably recorded. However, like the case of the thermal expansion coefficient, the representation with one value ($\beta$) does not have an effect on the estimation of the wavelength of reading light.

On the other hand, information on the temperature of the holographic recording medium 10 in writing and the wavelength of writing light may not be recorded in the emboss pits 8 in advance unless the recording is not specified in the system. Therefore, the information is written in the recording layer 5 in writing as holographic data information. The temperature of the holographic recording medium 10 may approximate to the surrounding temperature of the holographic recording medium 10, which is measured by a temperature measuring unit.

Generally, in order to increase the data amount within one page, one data pixel unit of the data pattern as shown in FIG. 6, of user data is reduced as much as possible. However, the data information may therefore not be read due to a slight difference in the diffraction condition.

Figure 7:
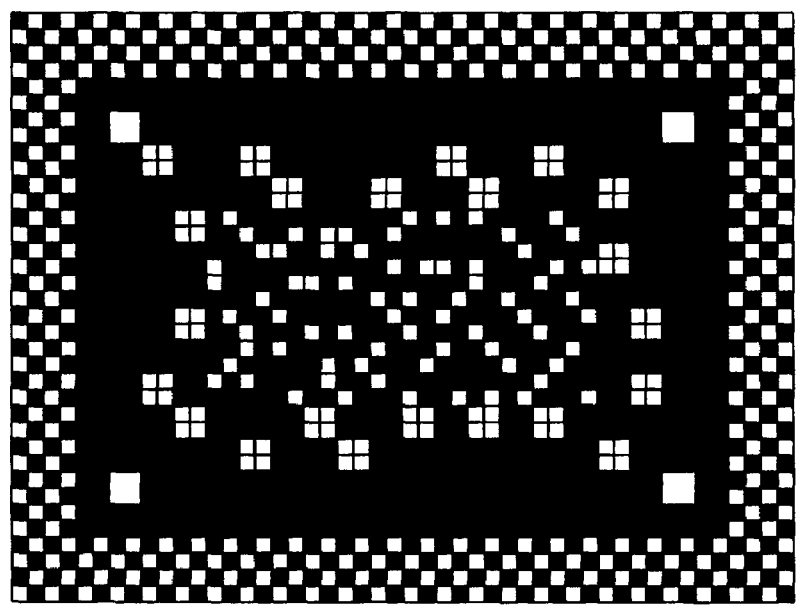
FIG. 7 is a diagram showing a pattern by which information on the surrounding temperature (Tw) in recording and the wavelength (λw) of writing light is recorded on a data page.
Figure 8:
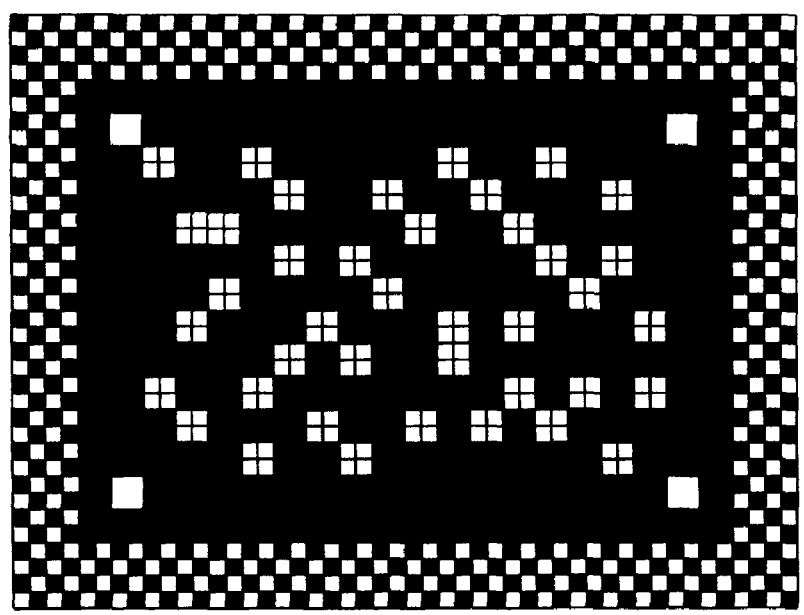
FIG. 8 is a diagram showing a pattern by which information on the surrounding temperature (Tw) in recording and the wavelength (λw) of writing light is recorded on a special page, which is different from a data page.

The wavelength for reading the information (information 1) on the surrounding temperature (Tw) of the holographic recording medium 10 in writing and the wavelength ($\lambda$w) of writing light, which is recorded for estimating the wavelength of reading light, does not typically satisfy the diffraction condition. Thus, the secure reading of the information is important even with the wavelength, which is slightly different from the wavelength satisfying the diffraction condition. Thus, as shown in FIG. 7, the information 1 is preferably recorded in larger data pixel units than data pixel units of a general data pattern. Alternatively, as shown in FIG. 8, a special page for recording the information 1 may be provided in addition to a normal data page.

However, even with such larger data pixels for recording the information on the surrounding temperature (Tw) of the holographic recording medium 10 in writing and the wavelength ($\lambda$w) of writing light, the wavelength largely deviating from the wavelength satisfying the diffraction condition may not be read. In this case, the information 1 may be required to read by changing the laser wavelength simultaneously.

When the thermal expansion coefficient ($\alpha$) of a recording material included in the recording layer 5, the temperature characteristic coefficient ($\beta$) of the refractive index, the surrounding temperature (Tw) in writing, the surrounding temperature (Tr) in reading and the wavelength ($\lambda$w) of writing light in writing are available in reading, the wavelength ($\lambda$r) of reading light satisfying the diffraction condition of the recording layer 5 can be estimated as:

$$\lambda r = (1+(\alpha-\beta)*(Tr-Tw))*\lambda w$$

where a higher-order term is ignored.

There is no problem if the wavelength of reading light in reading can be adjusted as estimated above, but the adjustment may not be implemented. However, accurate data reading may require the wavelength within at least ±1% from the wavelength satisfying the diffraction condition, and the range is desirably within ±0.5% under an especially strict diffraction condition that a lens with a high numerical aperture is used, for example.

Apparently, if the temperature characteristic coefficient of the refractive index of a recording material is sufficiently lower than the thermal expansion coefficient, the influence of the thermal expansion may be only required to consider. In this case, the temperature characteristic coefficient of the refractive index does not have to be recorded on a medium in advance, and the wavelength of reading light satisfying the diffraction condition may be considered as:

$$\lambda r = (1+\alpha(Tr-Tw))*\lambda w$$

Conversely, if the temperature characteristic coefficient of the refractive index of a recording material is dominant, the influence of a change in refractive index may be only required to consider. In this case, the thermal expansion coefficient does not have to be recorded on a medium in advance, and the wavelength of reading light satisfying the diffraction condition may be considered as:

$$\lambda r = (1-\beta(Tr-Tw))*\lambda w$$

A partial area of each data page may be used, as shown in FIG. 7, for the information on the surrounding temperature (Tw) in writing and the wavelength (λw) of writing light, which may be required here. Alternatively, as shown in FIG. 8, a special page for recording the information may be provided in addition to a normal data page.

An optical zoom is preferably adjusted when data information is read by changing the wavelength of reading light. More specifically, an optical zoom of λw/λr times allows reading data information in equal size to that in writing.

In a specific example of this example, the wavelength λr of reading light in reading is:

$$\lambda r = 411.5 \text{ nm}$$

where writing with the surrounding temperature Tw=25° C. in writing and the wavelength λw=405 nm of writing light is performed on a recording material with the linear expansion coefficient α=0.001/° C. and the temperature characteristic coefficient β=−0.00007/° C. of the refractive index, and reading is performed at a surrounding temperature of 40° C.

Notably, in this specific example, the wavelength of reading light λr in reading is $$\lambda r = 411.1 \text{ nm}$$

where the linear expansion coefficient is sufficiently large in comparison with the temperature characteristic coefficient of the refractive index and β=0,
which is not significantly different from the case where β is considered. Therefore, the value of the linear expansion coefficient may be only recorded on the holographic recording medium 10 by ignoring a change in refractive index.

Example 2

An Example in which the Reference Temperature and Reference Wavelength are Recorded in Advance The information on the reference wavelength and reference temperature is recorded in the emboss pits 8 of the holographic recording medium 10 in advance in addition to the information on the thermal expansion coefficient and the temperature dependency of the refractive index of a recording material as described in Example 1. In other words, the approximate wavelength in writing and reading that satisfies the diffraction condition can be estimated when a material characteristic such as the thermal expansion coefficient and the temperature dependency characteristic of the refractive index of the recording layer 5, the reference wavelength and reference temperature and the surrounding temperature in writing or reading are available.

First, data information may be recorded by reading the thermal expansion coefficient (α) of a recording material included in the recording layer 5, the temperature characteristic coefficient (β) of the refractive index, the reference wavelength (λc) and reference temperature (Tc) from the holographic recording medium 10, reading the surrounding temperature (Tw) from a holographic writing/reading system, and adjusting the wavelength (λw) of writing light in writing to the value calculated by:

$$\lambda w = (1+(\alpha-\beta)*(Tw-Tc))*\lambda c$$

In this case, the temperature characteristic coefficient of the refractive index is sufficiently small in comparison with the thermal expansion coefficient, the influence of the thermal expansion may be only required to consider. The temperature characteristic coefficient of the refractive index does not have to be recorded on the holographic recording medium 10 in advance. Therefore, the wavelength of writing light in writing may be considered as:

$$\lambda w = (1+\alpha(Tw-Tc))*\lambda c$$

Conversely, if the temperature characteristic coefficient of the refractive index is dominant, the influence of a change in refractive index may be only required to consider. In this case, the thermal expansion coefficient does not have to be recorded on the holographic recording medium 10 in advance. Therefore, the wavelength of writing light in writing may be considered as:

$$\lambda w = (1-\beta(Tw-Tc))*\lambda c$$

Writing with writing light having the wavelength allows the wavelength of the reading light satisfying the diffraction condition for data reading at the reference temperature (Tc) to be the reference wavelength (λc) regardless of the temperature at which the data information is written.

On the other hand, data information may be read by reading the surrounding temperature (Tr) from a holographic writing/reading system and adjusting the wavelength (λr) of reading light in reading to the value calculated by:

$$\lambda r = (1+(\alpha-\beta))*(Tr-Tc)*\lambda c$$

In this case, the temperature characteristic coefficient of the refractive index is sufficiently small in comparison with the thermal expansion coefficient, the influence of the thermal expansion may be only required to consider. The temperature characteristic coefficient of the refractive index does not have to be recorded on the holographic recording medium 10 in advance. Therefore, the wavelength of reading light satisfying the diffraction condition may be considered as:

$$\lambda r = (1+\alpha(Tr-Tc))*\lambda c$$

Conversely, if the temperature characteristic coefficient of the refractive index is dominant, the influence of a change in refractive index may be only required to consider. In this case, the thermal expansion coefficient does not have to be recorded on the holographic recording medium 10 in advance. Therefore, the wavelength of reading light satisfying the diffraction condition may be considered as:

$$\lambda r = (1-\beta(Tr-Tc))*\lambda c$$

Also in this example, there is no problem if the wavelengths of writing and reading light can be adjusted as estimated above, but the adjustment may not be implemented. However, accurate reading of data information may require writing and reading with the wavelength within at least ±1% from the wavelength, and the range is desirably within ±0.5% under an especially strict diffraction condition that a lens with a high numerical aperture is used, for example.

In a specific example of this example, the wavelength λw of writing light in writing is:

$$\lambda w = 402.8 \text{ nm}$$

where writing with the surrounding temperature Tw=20° C. in writing is performed on a recording material with the linear expansion coefficient α=0.001/° C., the temperature characteristic coefficient β=−0.00007/° C. of the refractive index in a system with the reference wavelength λc=405 nm and the reference temperature Tc=25° C.

On the other hand, data information recorded under these conditions is read at a surrounding temperature Tr=30° C. in reading, and the wavelength λr of reading light in reading is:

$$\lambda r = 407.2 \text{ nm}$$

Notably, also in this specific example, the wavelengths of writing and reading light is $\lambda w$=403.0 nm and $\lambda r$=407.0 nm where the linear expansion coefficient is sufficiently large in comparison with the temperature characteristic coefficient of the refractive index and $\beta$=0, which is not significantly different from the case where $\beta$ is considered. Therefore, the value of the linear expansion coefficient may be only recorded on the recording medium by ignoring a change in refractive index.

According to this example, the wavelength of reading light may be determined in reading only by considering the surrounding temperature in reading independently of the surrounding temperature in writing though the adjustment of the wavelength of writing light may be inconveniently required in writing. In other words, the wavelength and surrounding temperature of writing light in writing in Example 1 do not have to be recorded by a holographic scheme every time.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A holographic recording medium comprising:
a recording layer on a substrate, which records data information in a light interference pattern,
wherein at least one of information on a thermal expansion characteristic of a recording material contained in the recording layer and information on temperature dependency of the refractive index of the recording material are recorded within the holographic recording medium in advance.

2. The holographic recording medium according to claim 1, wherein the information on a thermal expansion characteristic of the recording material is a linear expansion coefficient in an actually-used environment temperature area of the holographic recording medium.

3. The holographic recording medium according to claim 1, wherein at least one of the information on the thermal expansion characteristic of the recording material and the information on the temperature dependency of the refractive index of the recording material are recorded as emboss pits of the substrate.

* * * * *